United States Patent
Shimizu

(10) Patent No.: US 7,338,042 B2
(45) Date of Patent: Mar. 4, 2008

(54) SHEET SUPPLYING APPARATUS

(75) Inventor: Koji Shimizu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 387 days.

(21) Appl. No.: 11/074,713

(22) Filed: Mar. 9, 2005

(65) Prior Publication Data
US 2005/0206972 A1 Sep. 22, 2005

(30) Foreign Application Priority Data
Mar. 19, 2004 (JP) ............................. 2004-081176

(51) Int. Cl.
*B65H 7/08* (2006.01)

(52) U.S. Cl. .................. 271/110; 271/270; 271/265.01; 358/498

(58) Field of Classification Search ................. 271/110; 258/498
See application file for complete search history.

(56) References Cited

U.S. PATENT DOCUMENTS

| | | | | |
|---|---|---|---|---|
| 3,575,411 | A * | 4/1971 | Kastelic ........................ | 271/227 |
| 4,558,373 | A * | 12/1985 | Plasencia et al. ............. | 358/484 |
| 4,662,738 | A * | 5/1987 | Kasuya ......................... | 399/47 |
| 4,996,604 | A * | 2/1991 | Ogawa et al. ................ | 358/474 |
| 5,119,145 | A * | 6/1992 | Honjo et al. ................. | 399/371 |
| 5,355,206 | A * | 10/1994 | Maruyama et al. .......... | 399/396 |
| 5,602,571 | A * | 2/1997 | Suda et al. ................... | 346/134 |
| 5,626,077 | A * | 5/1997 | Muller ......................... | 101/484 |
| 5,725,211 | A * | 3/1998 | Blanchard et al. ........ | 271/265.02 |
| 6,256,112 | B1 * | 7/2001 | Kawano ........................ | 358/1.9 |
| 6,257,692 | B1 * | 7/2001 | Yokoi et al. .................. | 347/16 |
| 6,259,867 | B1 * | 7/2001 | Park et al. .................... | 399/21 |
| 6,311,973 | B1 * | 11/2001 | Tanaka et al. ............... | 271/314 |
| 6,340,156 | B1 * | 1/2002 | Sekita .......................... | 271/270 |
| 6,750,991 | B2 * | 6/2004 | Cardot et al. ................ | 358/497 |
| 6,794,633 | B2 * | 9/2004 | Iwasaki ....................... | 250/221 |
| 7,036,737 | B2 * | 5/2006 | Nakayama et al. ....... | 235/462.25 |
| 7,150,455 | B2 * | 12/2006 | Furukawa et al. ........... | 271/270 |
| 2003/0068181 | A1 * | 4/2003 | Miyata et al. ............... | 399/394 |
| 2003/0094748 | A1 * | 5/2003 | Chujo et al. ................. | 271/262 |
| 2003/0193673 | A1 * | 10/2003 | Yamamoto ................... | 358/1.1 |
| 2003/0222396 | A1 * | 12/2003 | Kurahashi et al. ........... | 271/207 |
| 2003/0235448 | A1 | 12/2003 | Nemura et al. .............. | 399/389 |
| 2004/0007806 | A1 * | 1/2004 | Suzuki ......................... | 271/110 |
| 2004/0022564 | A1 | 2/2004 | Fujii et al. ................... | 399/382 |
| 2004/0114155 | A1 * | 6/2004 | Kurahashi et al. ........... | 358/1.1 |
| 2004/0212855 | A1 | 10/2004 | Okamoto ..................... | 358/498 |

(Continued)

FOREIGN PATENT DOCUMENTS

| | | | |
|---|---|---|---|
| JP | 08274942 A | * | 10/1996 |
| JP | 10-42158 | | 2/1998 |
| JP | 2001-130769 | | 5/2001 |
| JP | 2002-281322 | | 9/2002 |

*Primary Examiner*—Patrick Mackey
*Assistant Examiner*—Howard Sanders
(74) *Attorney, Agent, or Firm*—Fitzpatrick, Cella, Harper & Scinto

(57) ABSTRACT

The uppermost original of a bundle of originals placed on a stacking tray is photographed by an area sensor, and on the basis of chroma saturation information of image information thus obtained, whether the original to be separated is a color original is discriminated. If the original to be separated is a black-and-white original, the separating speed is set to an ordinary separating speed, and if the original to be separated is a color original, the separating speed is set to a separating speed lower than the ordinary separating speed.

12 Claims, 17 Drawing Sheets

U.S. PATENT DOCUMENTS

2004/0227283 A1* 11/2004 Hanada et al. .............. 271/270
2005/0018228 A1* 1/2005 Takahashi ................... 358/1.9
2005/0238372 A1* 10/2005 Shinohara et al. ............ 399/44
2007/0098421 A1* 5/2007 Takahashi .................... 399/44

* cited by examiner

FIG. 12

DO YOU SET COLOR ORIGINAL SEPARATING MODE?

YES    NO

FIG. 16

PLEASE SET READING METHOD

| AUTO | ONLY FLOW READING | ONLY FIXED-READING |

SHEET SUPPLYING APPARATUS

BACKGROUND OF THE INVENTION

1. Field of the Invention

The invention relates to a sheet supplying apparatus for separating and conveying a plurality of sheets placed thereon one by one.

2. Description of Related Art

As a sheet reading apparatus for use in an image processing apparatus such as a scanner apparatus or a copying machine, there is known one using two reading methods together. One of the methods is a fixed-reading method of scanning an original in a fixed state by a scanner, and reading the image of the original. The other is a flow reading method of reading the image of an original while conveying the original with the scanner fixed.

In recent years, color image forming apparatuses have spread and in an automatic original supplying (feeding) apparatus carried on the above-mentioned sheet reading apparatus, opportunities for supplying color originals have increased. Particularly, in color printing of high resolutions, importance is attached to the quality of image and therefore, it has been necessary to read a color original in a stable state. In the aforedescribed flow reading method, the image of an original is read while the original is conveyed and therefore, the vibration of the original itself being conveyed, or a blurred image due to the shock at a moment when the leading edge of the original cuts in between rollers in the automatic sheet feeding apparatus or the trailing edge of the original leaves the rollers has occurred, and various problems have arisen in realizing color printing of high resolution.

Also, due to the difference in quality of paper between a color-copied sheet used as an original (hereinafter referred to as the color original) and a black-and-white original, for example, the difference in the thickness (μ) of paper or the applied amount of oil or the like, even if the automatic sheet feeding apparatus is caused to effect the same control for originals differing in quality of paper from each other, it has been impossible to realize a similar operation. Particularly, when the applied amount of oil is great, it has been difficult to separate originals placed on an original tray one by one.

As what controls such an original supplying operation, there is known an automatic sheet feeding apparatus which is designed such that a movement speed V1 when separating and conveying originals having image information on one side only thereof and a movement speed V2 when separating and conveying originals having image information on two sides thereof assume the relation that V1>V2, and which is improved in separating performance and can prevent a plurality of originals from being paid away at a time (for example, Japanese Patent Application Laid-Open No. 2001-130769).

Also, there is known an automatic sheet feeding apparatus which, before main scan, judges an original to be color-reproduced or an original to be black-and-white-reproduced after the original has been conveyed onto an original plate (platen glass) (for example, Japanese Patent Application Laid-Open No. 2002-281322). Also, there is known an automatic sheet feeding apparatus which discriminates whether an original is monochromatic or polychromatic, and changes a reading speed to a low speed mode when the original is discriminated as polychromatic (for example, Japanese Patent Application Laid-Open No. H10-42158).

The above-described conventional sheet reading apparatus, however, has suffered from the following problem and a solution thereto has been desired. That is, before the originals are separated and conveyed, it has been impossible to obtain information regarding the originals placed on the stacking tray. Therefore, when for example, originals are to be separated and conveyed one by one from a bundle of originals comprising a mixture of color originals and black-and-white originals, it has been impossible to perform the optimum separation and conveyance (supplying operation) of the sheets unless a user changes setting each time.

SUMMARY OF THE INVENTION

It is an object of the present invention to provide a sheet supplying apparatus which has solved the above-noted problem and a controlling method therefore.

It is another object of the present invention to provide a sheet supplying apparatus which can obtain information regarding a sheet, and can perform an optimum sheet supplying operation on the basis of the obtained information regarding the sheet, and a controlling method therefor.

Other objects of the present invention will become apparent from the following description based on the accompanying drawings and the appended claims.

BRIEF DESCRIPTION OF THE DRAWINGS

FIG. 12 shows a setting screen for an original separating speed.

FIG. 16 shows a setting screen for an original reading method.

DETAILED DESCRIPTION OF THE PREFERRED EMBODIMENTS

Some embodiments of the sheet supplying apparatus of the present invention will hereinafter be described with reference to the drawings. The sheet supplying apparatus of the present invention is carried on a copying machine as an image processing apparatus, and is applied to an automatic original supplying apparatus for supplying an original to an image reading apparatus provided in a copying machine main body.

First Embodiment (Schematic Construction of a Copying Machine)

Figure 1:
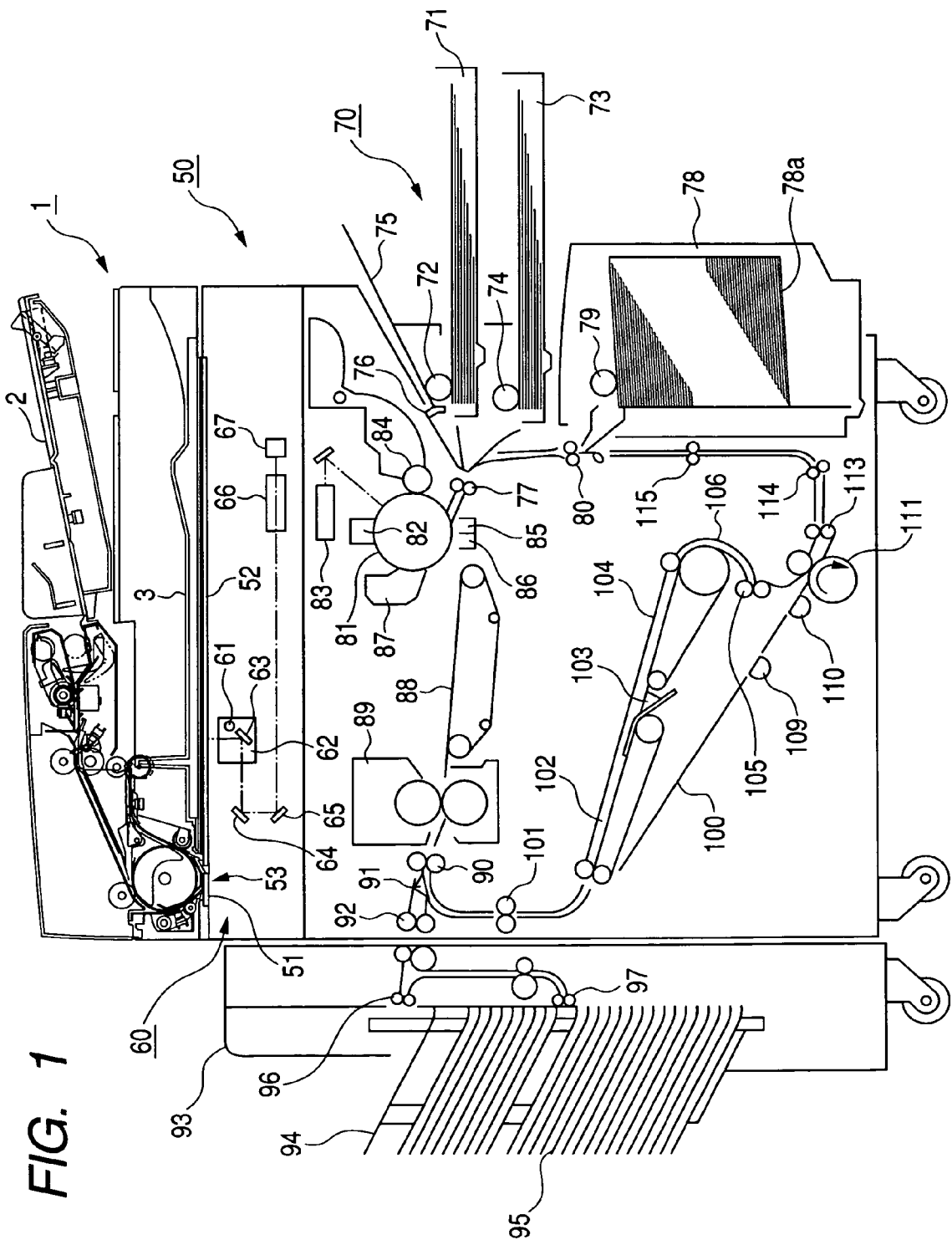
FIG. 1 is a cross-sectional view schematically showing the construction of a copying machine in a first embodiment.

FIG. 1 is a cross-sectional view schematically showing the construction of a copying machine in a first embodiment. A copying machine main body 50 is comprised of a reader portion 60 and a printer portion 70. The reader portion 60 serves to optically read image information recorded on an original P, and receives reflected light from the original P, effects the photoelectric conversion thereof and obtains image data. On the upper surface of the housing of the reader portion 60, there are provided a flow reading platen (flow reading original plate) 51 and a book platen (book original plate) 52. Also, in the interior of the housing, there are disposed a scanner unit 63 comprising a lamp 61 and a mirror 62, mirrors 64 and 65, a lens 66, an image sensor 67, etc.

When the automatic original supplying apparatus 1 is used, the reader portion 60 stops the scanner unit 63 at a reading position 53, and reads the image of an original while moving the original on the flow reading platen 51. On the other hand, when the automatic original supplying apparatus 1 is not used, the reader portion 60 reads the image of an original placed on the book platen 52 while scanning the original by the scanner unit 63.

The printer portion 70 serves to form an image by an electrophotographic process. Sheets contained in an upper cassette 71 in the printer portion 70 are separated and fed one by one by a separating pawl and a feeding roller 72 and are directed to registration rollers 77. Likewise, sheets contained in a lower cassette 73 are separated and fed one by one by a separating pawl and a feeding roller 74 and are directed to the registration rollers 77. Also, sheets inserted from a manually inserting guide 75 are directed one by one through the intermediary of a roller 76. Also, a sheet deck 78 has an intermediate plate 78a driven up and down by a motor or the like, and sheets placed on this intermediate plate 78a are separated and fed one by one by a separating pawl and a feeding roller 79 and are directed to conveying rollers 80, and are further directed to the registration rollers 77 by the conveying rollers 80.

An image forming portion for forming an image on the sheet fed out from the registration rollers 77 has a photosensitive drum 81, a primary charging device 82 for uniformly charging the surface of this drum, an optical unit 83 for applying a laser beam (image light) conforming to image information to the surface of the drum to thereby form an electrostatic latent image thereon, a developing device 84 for applying a toner to the surface of the drum to thereby form a toner image conforming to the electrostatic latent image, a transferring charging device 85 for charging the sheet and transferring the toner image formed on the surface of the drum to the sheet, a separating charging device 86 for eliminating charges from the sheet to which the toner image has been transferred and separating the sheet from the surface of the drum, and a cleaning device 87 for removing any toner residual on the surface of the drum after the transfer.

Also, the sheet on which the image has been formed is placed on a conveying belt 88 and is directed to a fixing apparatus 89 thereby. When in the fixing apparatus 89, the toner image is fixed on the sheet, the sheet is directed to discharging rollers 92 by conveying rollers 90 and a diverter 91, and is conveyed into a sorter 93 by these discharging rollers 92.

The sorter 93 has a no-sort tray 94, a sort bin tray 95, non-sort tray discharging rollers 96 and sort bin tray discharging rollers 97, and moves up and down the non-sort tray 94 and the sort bin tray 95 to thereby divide the sheets stage by stage. In some cases, a discharging tray is mounted instead of the sorter 93.

Also, when two-side copying or multiplex copying is to be effected, the sheet after fixing is branched off by the diverter (flapper) 91 and is conveyed to conveying rollers 101. In the case of two-side copying, the sheet is discharged onto an intermediate tray 100 via belts 102 and 104, a path 106 and discharging rollers 105. Further, the sheet discharged onto the intermediate tray 100 is fed by half-moon rollers 109 and 110, and is conveyed to the registration rollers 77 by a pair of separating rollers 111 and conveying rollers 113, 114 and 115.

Also, the automatic original supplying apparatus (ADF) 1 is openably and closably installed on the upper portion of the copying machine main body 50. In this automatic original supplying apparatus 1, originals P stacked on a stacking tray 2 located above it are separated and fed one by one in succession from the uppermost sheet and are conveyed to flow reading platen glass (platen) which is the reading position of the copying machine main body 50. The images of the originals are read while the originals are conveyed, and when the reading of the images is finished, the originals are stacked on a discharging tray 3.

(Schematic Construction of the Automatic Original Supplying Apparatus)

Figure 2:
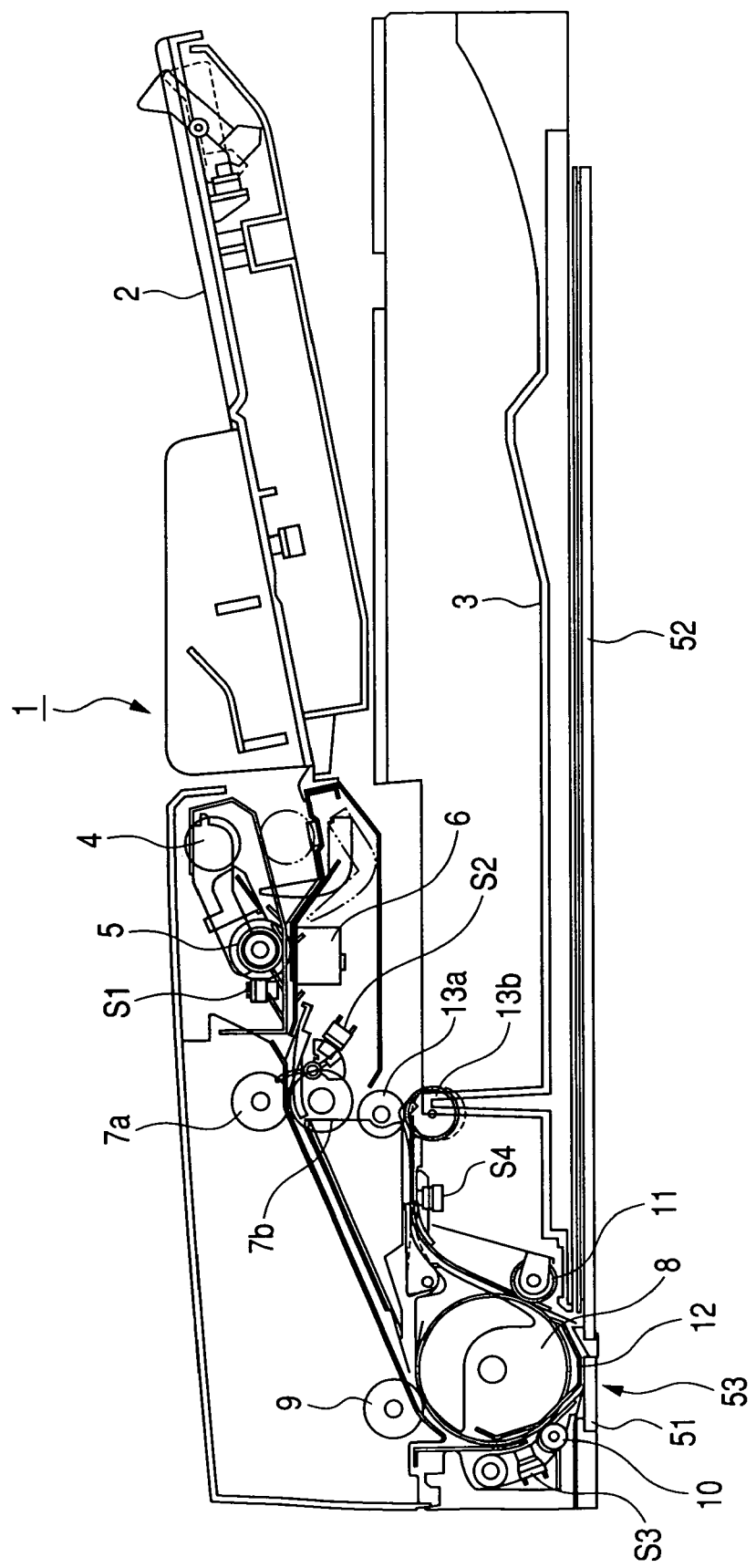
FIG. 2 is a cross-sectional view showing the internal construction of an automatic original supplying apparatus 1.
Figure 3:
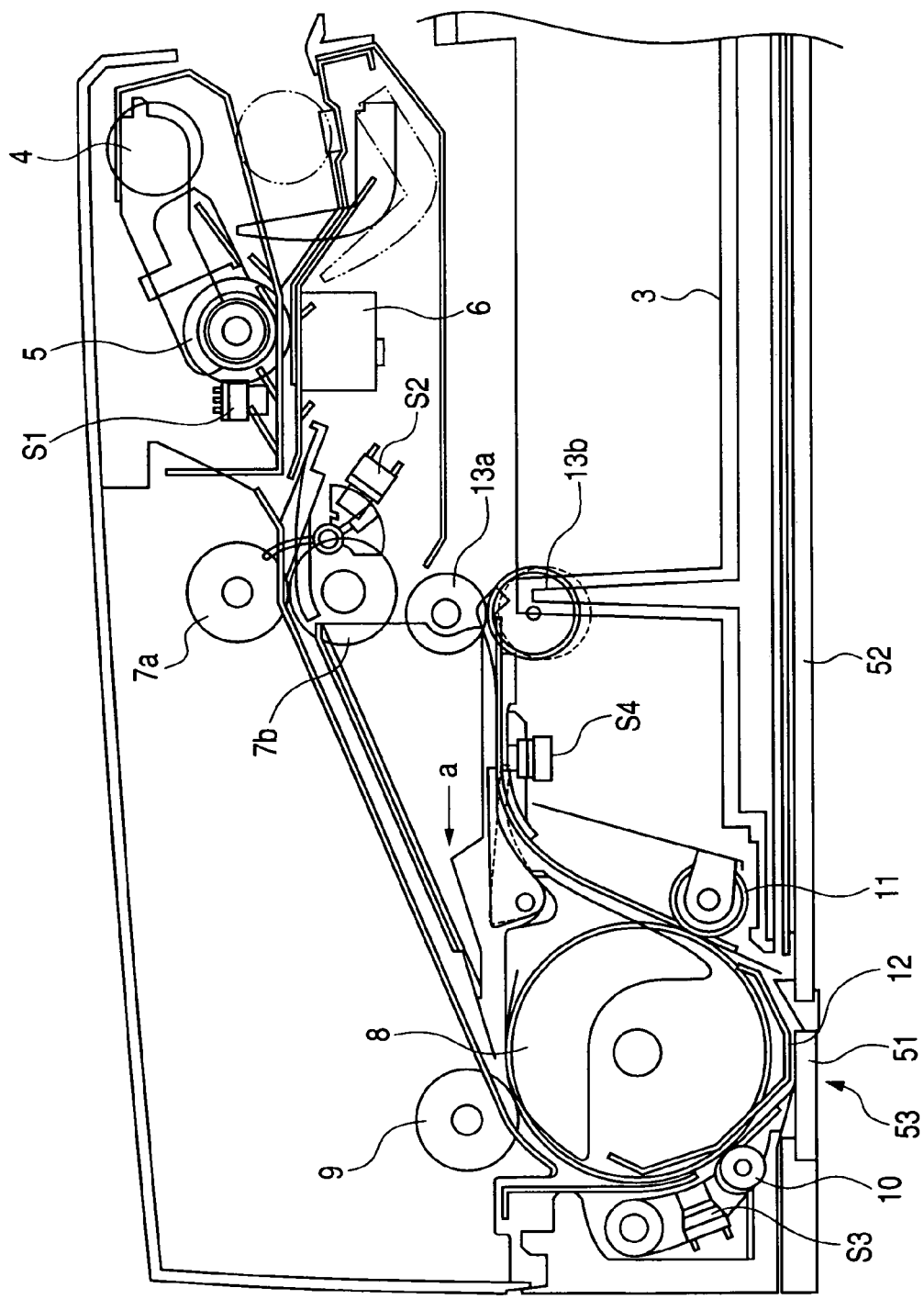
FIG. 3 is a cross-sectional view showing an original conveying portion in the automatic original supplying apparatus 1 on an enlarged scale.

FIG. 2 is a cross-sectional view showing the internal construction of the automatic original supplying apparatus 1. FIG. 3 is a cross-sectional view showing an original conveying portion in the automatic original supplying apparatus 1 of FIG. 2 on an enlarged scale. The automatic original supplying apparatus 1 according to the present embodiment is divided broadly into an original feeding portion, a separating portion, an original discharging portion, and as reading modes, it corresponds to two modes, i.e., a one-side reading mode for reading the image information of one side only of an original, and a two-side reading mode for reading the image information of the two sides of the original.

The construction and operation of each portion of the automatic original supplying apparatus 1 will be shown below along the flow of the original conveyed in each reading mode. First, the case of the one-side reading mode will be shown. The automatic original supplying apparatus 1 is provided with the stacking tray 2 which is a portion of the original feeding portion, and originals are stacked on this stacking tray 2. Also, the original feeding portion is provided with a pay-out roller 4, and a bundle of originals stacked on the stacking tray 2 is introduced into the separating portion by the pay-out roller 4, and the originals are separated one by one from the bundle of originals in succession from the uppermost sheet by a feeding roller 5 and a frictional separating pad 6 constituting the separating portion, and are conveyed to first registration rollers 7a and 7b. When the leading edge of the original has arrived at the first registration rollers 7a and 7b, the first registration rollers 7a and 7b at a halt, and when a loop is formed in the original being conveyed in this state by the feeding roller 5, the skew feed of the original is corrected. After the skew feed of the original has been corrected, the first registration rollers 7a and 7b are activated to thereby convey the original to the original conveying portion at the next stage.

In the original conveying portion, the original conveyed from the original feeding portion is conveyed by a lead roller 8, a second registration roller 9, a lead runner 10 and a lead runner 11 so as to pass through a gap between the flow reading platen 51 and a white plate 12 at a predetermined speed. At this time, the scanner unit 63 (see FIG. 1) is fixed in the copying machine main body 50 corresponding to the reading position 53 on the flow reading platen 51, and performs an exposing operation (reading operation) with the passage of the original.

Also, in the original discharging portion, there are provided a discharging and reversing roller 13a and a discharging and reversing roller 13b, and the discharging and reversing roller 13a and the discharging and reversing roller 13b are spaced apart from each other during the time when the exposing operation is performed at the reading position 53, but when the trailing edge of the original passes the reading position 53 and the reading operation is finished, the discharging and reversing roller 13b is moved upwardly (from a broken-line position to a solid-line position as viewed in FIG. 2). Thus, the discharging and reversing roller 13a and the discharging and reversing roller 13b nip the original therebetween, and discharge the original onto the discharging tray 3.

In the separating portion, there is provided a separation detecting sensor S1 for detecting the separated and fed original, and the leading edge and trailing edge of the original are detected by the separation detecting sensor S1. Also, a registration sensor S2 is provided near the first registration rollers 7a and 7b, and the leading edge of the original having arrived at the first registration rollers 7a and 7b is detected by the registration sensor S2. Also, a lead sensor S3 is disposed around the lead roller 8, and when the leading edge of the original is detected signal thereof is transmitted to the reader portion 60 of the copying machine main body 50. A discharge sensor S4 is provided in the original discharging portion, and the leading edge and trailing edge of the original are detected by this discharge sensor S4.

The case of the two-side reading mode will now be shown. The originals stacked on the stacking tray 2 are separated one by one in the original feeding portion, and are conveyed to the original conveying portion. In the original conveying portion, as in the one-side reading mode, the original is conveyed so as to pass through the interstice between the flow reading platen 51 and the white plate 12 at a predetermined speed. At this time, the scanner unit 63 is fixed below the reading position 53, and the exposing operation (reading operation) for the front side which is the first side is performed by the scanner unit 63.

After the trailing edge of the original has passed the discharge sensor S4, the discharging and reversing rollers 13a and 13b are reversely rotated to thereby switch back and convey the original toward the second registration roller 9 located in a direction opposite to the discharge direction of the original (see the arrow "a" in FIG. 3). When the leading edge of the original has arrived at the second registration roller 9, the second registration roller 9 is at a halt, and when in this state, the original is conveyed by the drive of the discharging and reversing rollers 13a and 13b, a loop is formed on the trailing edge side thereof, and skew feed correction in the two-side reading mode is effected. Thereafter, the second registration roller 9 is driven to thereby convey the original to the original conveying portion. The original conveying portion conveys the original to the original discharging portion after the exposing operation (reading operation) for the back side which is the second side, as for the front side which is the first side, has been performed.

Here, in the automatic original supplying apparatus 1 according to the present embodiment, because of its construction, after the reading of the back side which is the second side has been effected, the original assumes a face-up state (a state in which the front side which is the first side faces upwardly of the apparatus), and the order of the originals to be discharged goes wrong. Thus, the originals stacked on the stacking tray 2 in the order of pages go wrong in the order of page on the discharging tray 3 and therefore, it is necessary to effect re-reversal. Therefore, the original discharging portion, after the trailing edge of the original has passed the discharge sensor S4, reverses the rotation of the discharging and reversing rollers 13a and 13b, and again conveys the original toward the original conveying portion. The original which has passed the original conveying portion is again conveyed to the original discharging portion, and when nipped by and between the discharging and reversing rollers 13a and 13b, the original is discharged onto the discharging tray 3 with its back side facing upwardly. Thus, the original is discharged in a state in which the front side which is the first side faces down (a face-down state). At this time, in the original conveying portion, the operation of reversing the side of the original is only performed for the back-side discharge and therefore, the skew feed correction at the second registration roller 9 is not effected.

(Construction of the Area Sensor)

Figure 4:
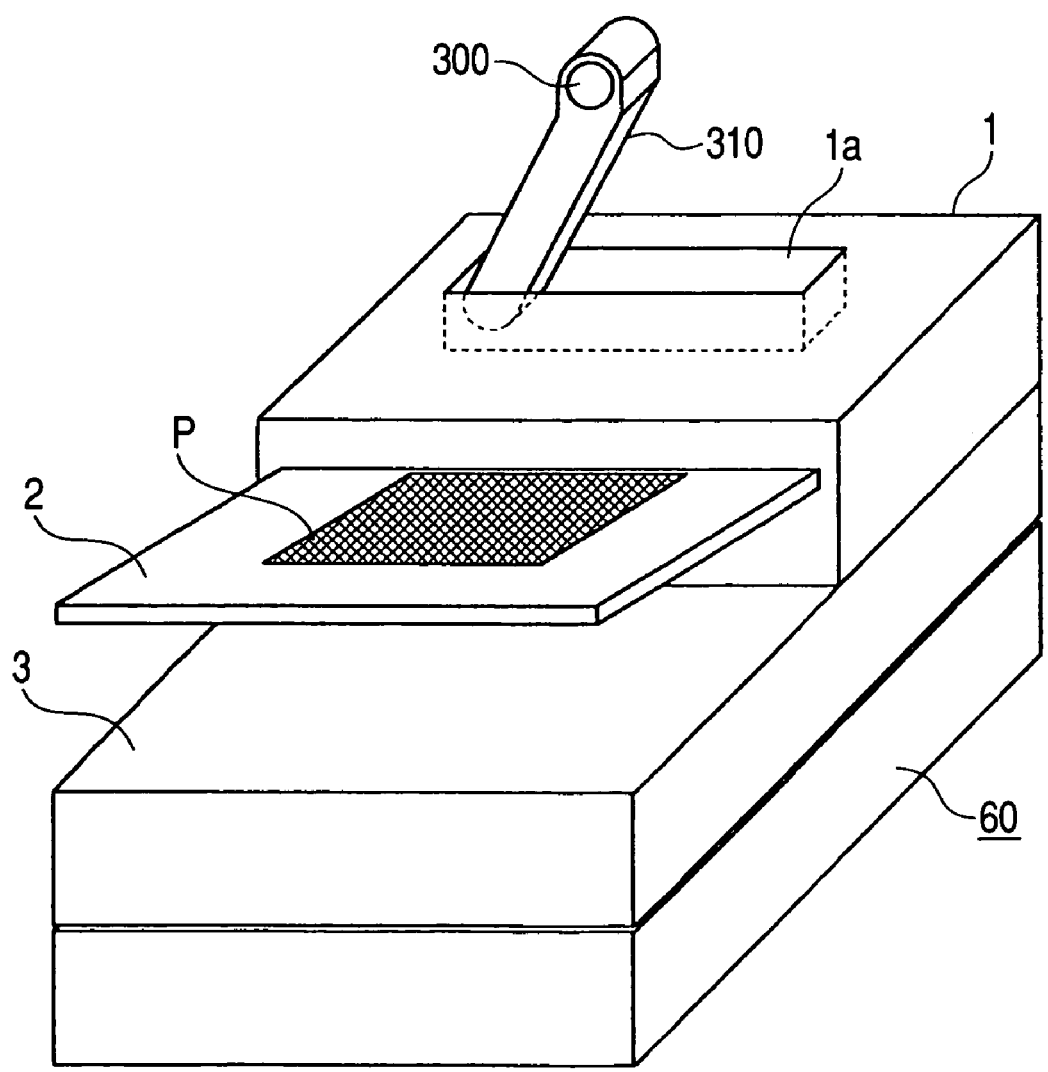
FIG. 4 is a pictorial perspective view of the automatic original supplying apparatus.

FIG. 4 is a pictorial perspective view of the automatic original supplying apparatus. A camera main body 310 having an area sensor 300 is rotatably provided on the upper surface of the housing of the automatic original supplying apparatus 1 provided with the stacking tray 2 and the discharging tray 3. This camera main body 310, when not used, is contained in a recess 1a formed in the upper surface of the housing, and during the use for original reading, it becomes upright so as to protrude from the recess 1a. In the upright state, the area sensor 300 in the camera main body 310 has a field of view capable of photographing the stacking tray 2, and can photograph the original P placed on the stacking tray 2. When the original P is photographed by this area sensor 300, the feature information of the original such as the size and color (chroma saturation) of the photographed original P can be obtained. Here, as the area sensor, use is made of a CCD, an MOS sensor or the like.

The camera main body having the area sensor can be installed at a position whereat it can photograph the stacking tray, and need not always be of rotatable structure containable in the upper surface of the housing of the automatic original supplying apparatus as in the present embodiment, but may be fixed structure remaining upright on the upper surface of the housing. Also, instead of being installed on the automatic original supplying apparatus, it may be mounted on the copying machine main body. Also, in the case of an automatic original supplying apparatus of a type in which originals are fed in succession from the lowermost one of a bundle of originals placed on a stacking tray, the area sensor may be provided on the upper surface of the stacking tray so as to photograph the lowermost original.

(Hardware Construction of a Controlling Portion in the Copying Machine)

Figure 5:
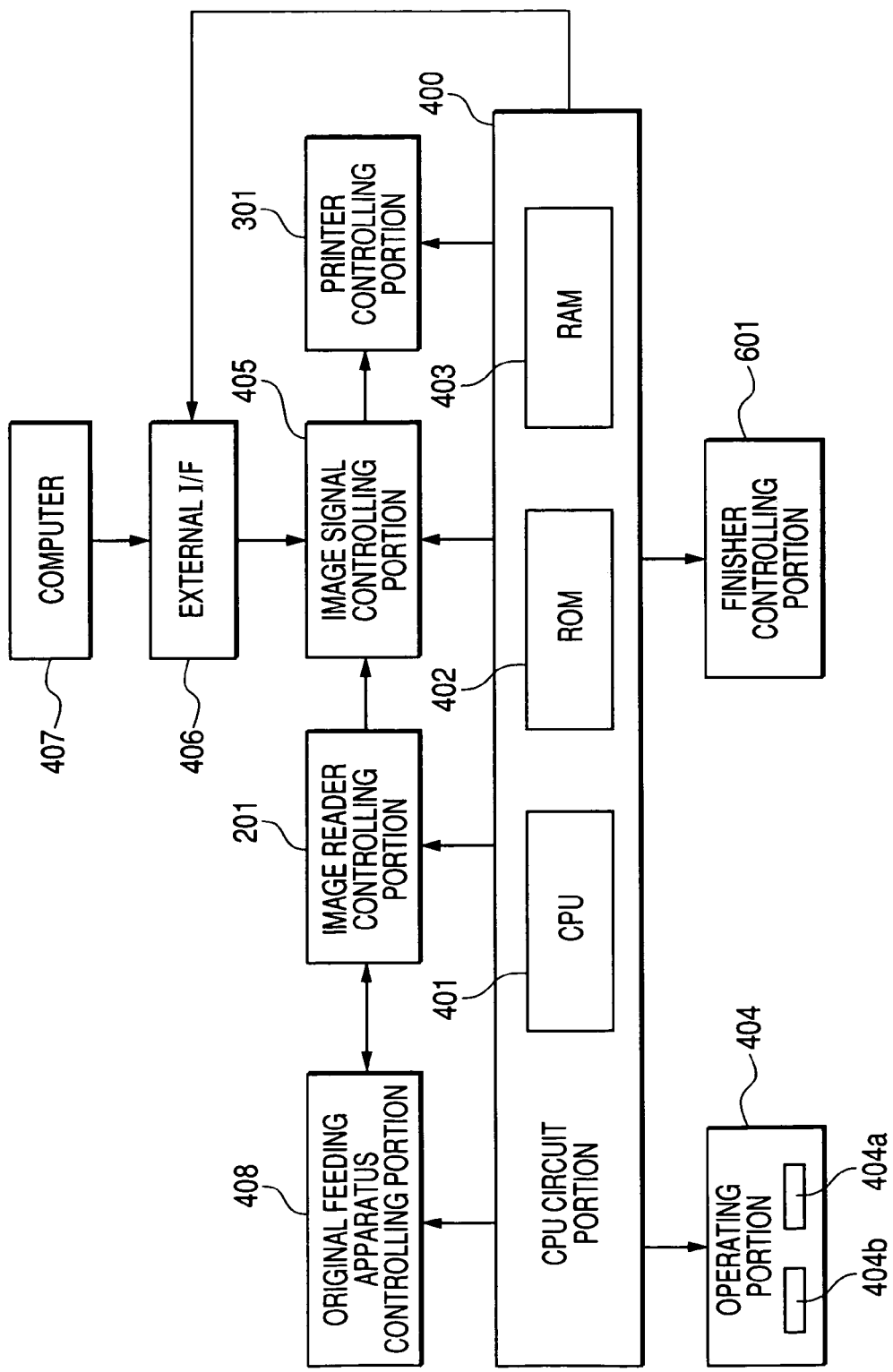
FIG. 5 is a block diagram showing the hardware construction of a controlling portion in the copying machine.

FIG. 5 is a block diagram showing the hardware construction of a controlling portion in the copying machine. The controlling portion serves to control the entire copying machine, and is constituted chiefly by a CPU circuit portion 400. The CPU circuit portion 400 is provided with a CPU 401, a ROM 402, a RAM 403, etc.

The CPU circuit portion 400 governs the control of an original feeding apparatus controlling portion 408 for controlling the automatic original supplying apparatus 1, an image reader controlling portion 201 for controlling the reader portion 60, an image signal controlling portion 405, a printer controlling portion 301 for controlling the printer portion 70, a finisher controlling portion 601 for controlling the sorter 93, and an external interface (I/F) 406, in accordance with a program stored in the ROM 402 and executed by the CPU 401, and the setting of an operating portion 404.

The RAM 403 is used as an area for temporarily holding control data, and a working area for calculation accompanying the control. The external I/F 406 is an interface with an external computer 407, and evolves print data from the external computer 407 into image data and outputs it to the image signal controlling portion 405. The image reader controlling portion 201 outputs to the image signal controlling portion 405 an image signal read by an image sensor (not shown). The image data outputted from the image signal controlling portion 405 to the printer controlling portion 301 is inputted to an exposure controlling portion. Various keys such as a start key 404a and a setting key 404b are disposed in the operating portion 404.

Figure 6:
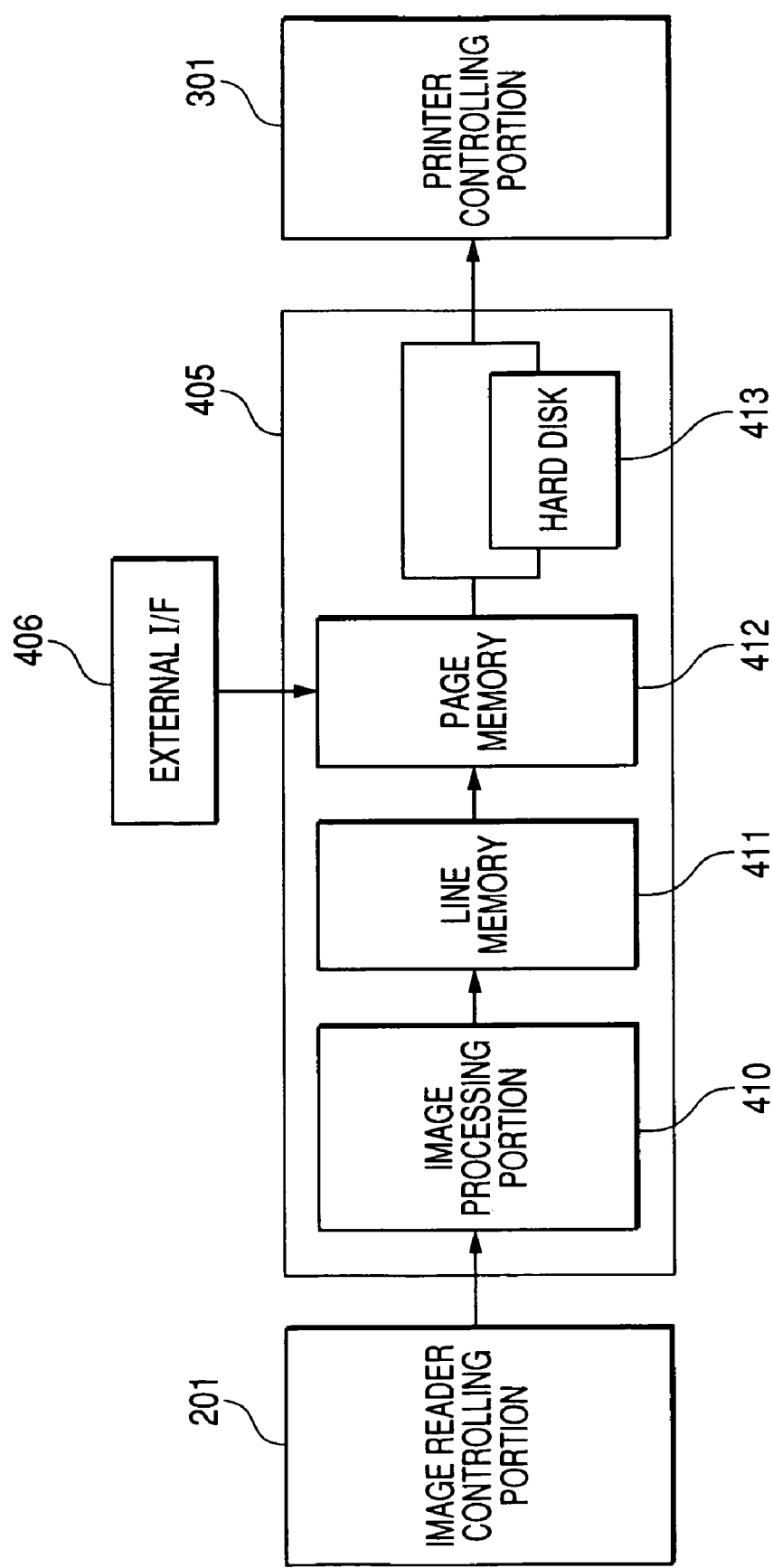
FIG. 6 is a block diagram showing the construction of an image signal controlling portion 405.

FIG. 6 is a block diagram showing the construction of the image signal controlling portion 405. The image signal controlling portion 405 has an image processing portion 410, a line memory 411, a page memory 412 and a hard disk 413. The image processing portion 410 carries out an image correcting process and an editting process conforming to the setting of the operating portion 404. Mirror image processing or the like for replacing the image in a main scanning direction is carried out in the line memory 411. The image in the line memory 411 is stored in the page memory 412, and thereafter is outputted to the printer controlling portion 301.

(Hardware Construction of the Automatic Original Supplying Apparatus)

Figure 7:
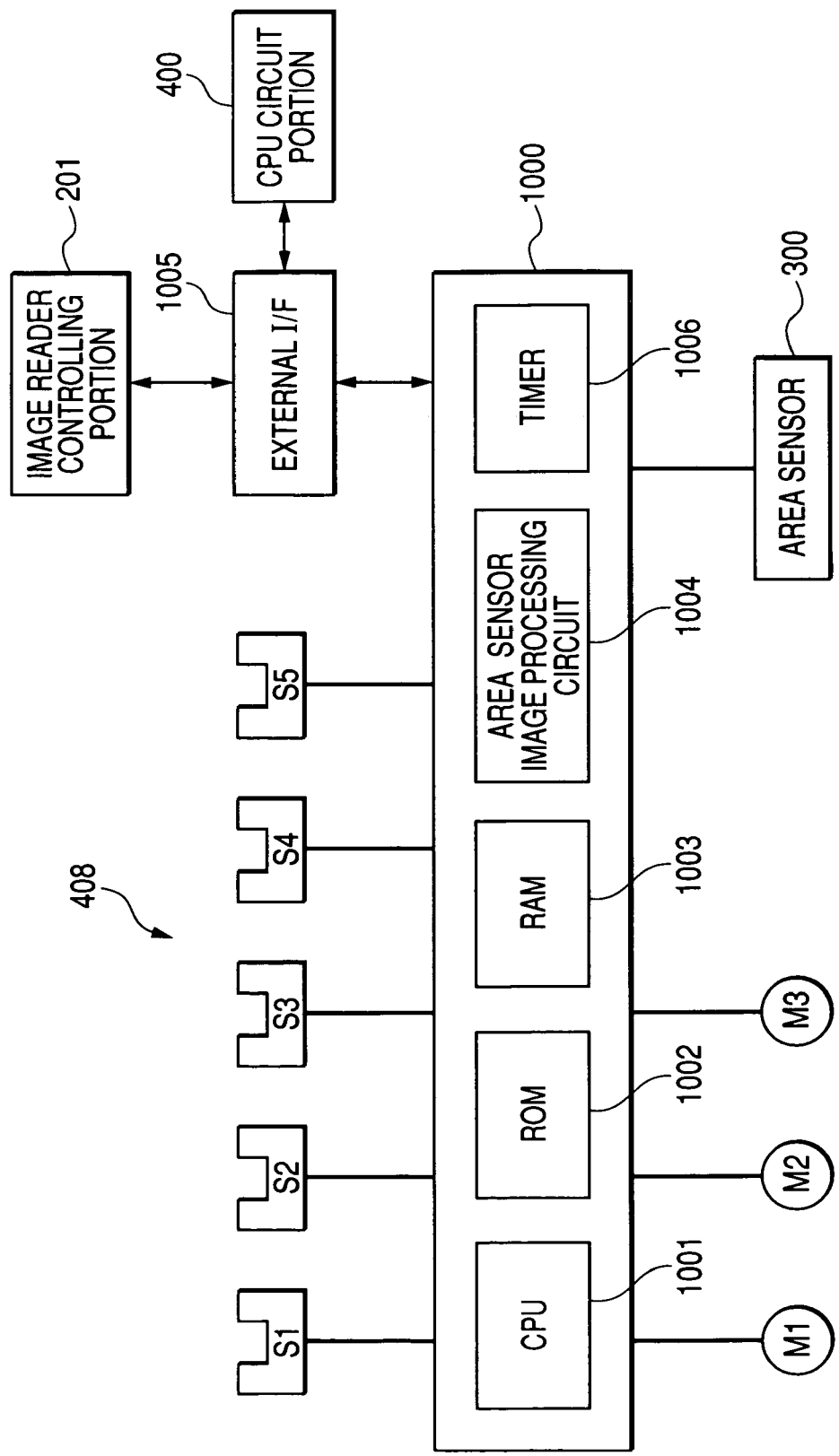
FIG. 7 shows the hardware construction of an original feeding apparatus controlling portion 408 in the automatic original supplying apparatus.

FIG. 7 shows the hardware construction of an original feeding apparatus controlling portion 408 in the automatic original supplying apparatus 1. A CPU circuit portion 1000 serves to control the entire automatic original supplying apparatus 1, and has a CPU 1001, a ROM 1002, a RAM 1003, an area sensor image processing circuit 1004 and a timer 1006. A program to be executed by the CPU 1001 is stored in the ROM 1002. The RAM 1003 is used as an area for temorarily holding control data, a working area for calculation accompanying the control, etc. The area sensor image processing circuit 1004 converts output data from the area sensor 300 into image information.

Also, the CPU circuit portion 1000 has connected thereto an external interface (I/F) 1005, the area sensor 300, the separation detecting sensor S1, the registration sensor S2, the lead sensor S3, the discharge sensor S4, the original detecting sensor S5, a separating motor M1, a lead motor M2, a discharging motor M3, etc. The external I/F 1005 is an interface which effects communications with the image reader controlling portion 201, the CPU circuit portion 400, etc. The separating motor M1 separates the originals placed on the stacking tray used in the automatic original supplying apparatus 1. The lead motor M2 conveys the separated original to the reading position. The discharging motor M3 discharges the original which has been read onto the discharging tray 3. These motors are controlled by the CPU circuit portion 1000. The original detecting sensor S5 is provided on the stacking tray 2, and detects whether the originals are placed on the stacking tray 2.

Figure 8:
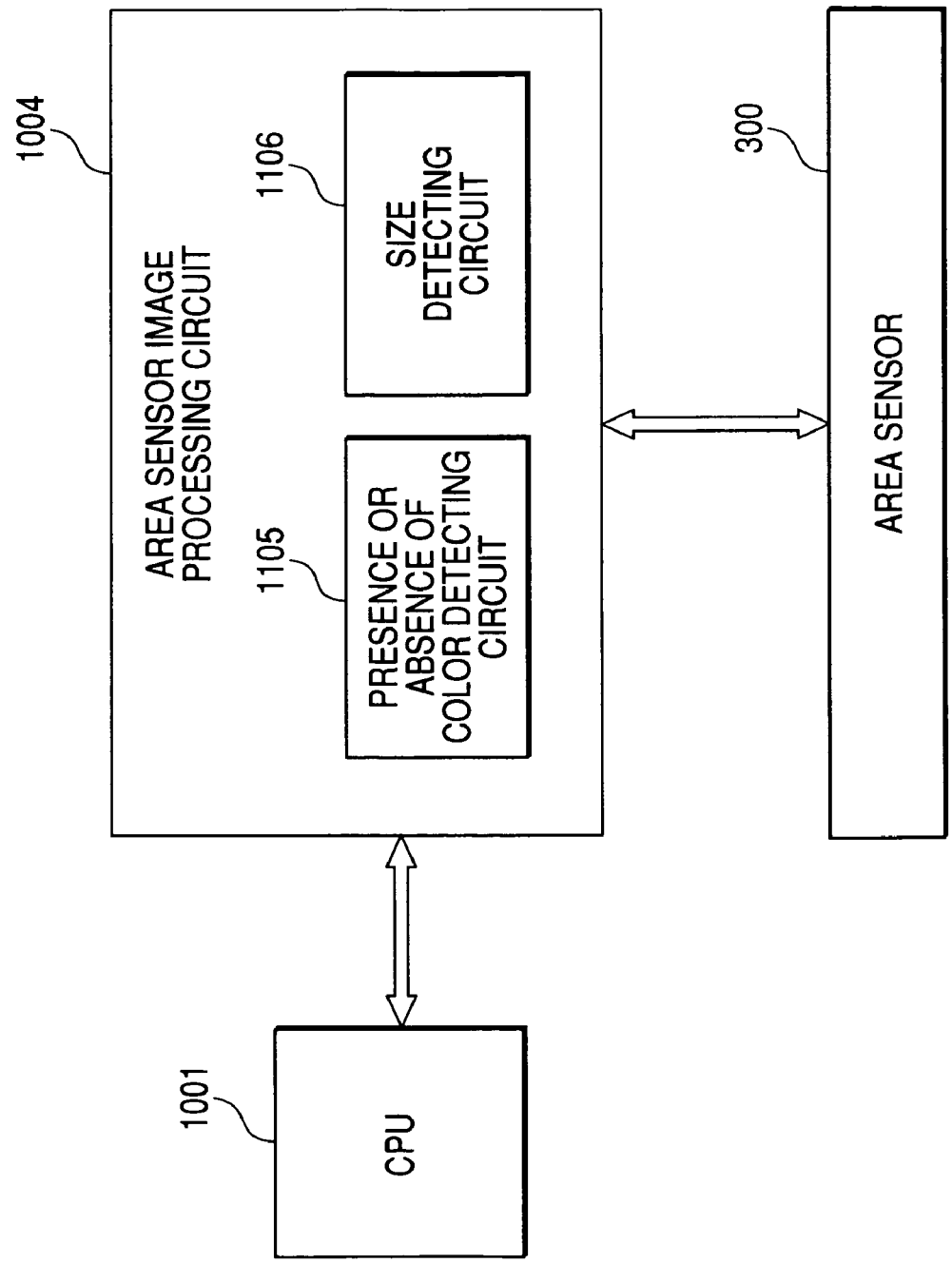
FIG. 8 schematically shows the construction of an area sensor image processing circuit 1004.

FIG. 8 schematically shows the construction of the area sensor image processing circuit 1004. The area sensor image processing circuit 1004 is provided with a presence or absence of color detecting circuit 1105 and a size detecting circuit 1106. The presence or absence of color detecting circuit 1105 discriminates on the basis of the image signal outputted from the area sensor 300 whether color information is present on the original. The size detecting circuit 1106 discriminates the size of the original on the basis of the image signal outputted from the area sensor 300. The color information and size information thus discriminated are transmitted to the CPU 1001 for use for the control of the automatic original supplying apparatus 1.

(Image Detecting Operation)

Figure 9:
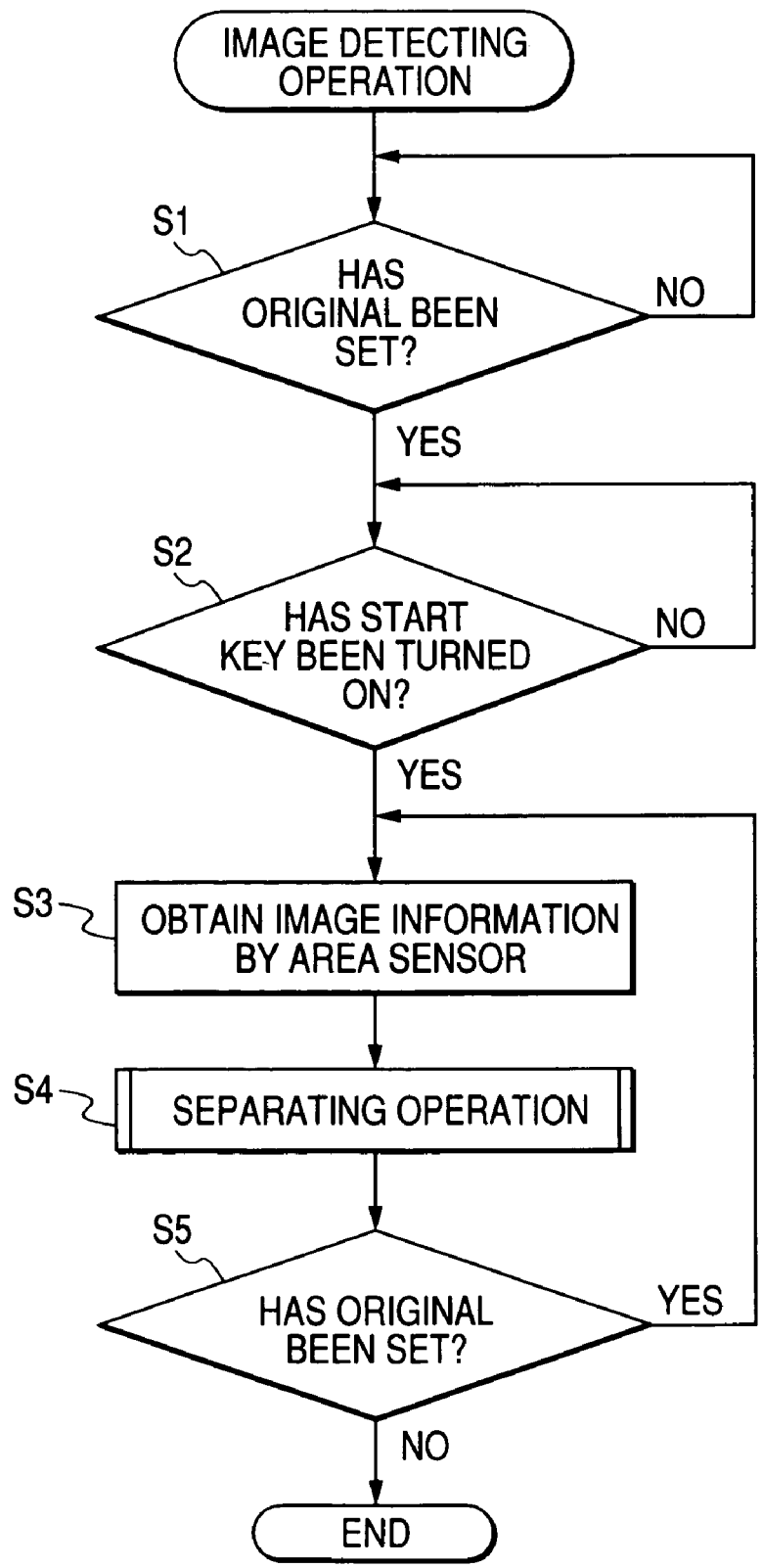
FIG. 9 is a flow chart showing an image detecting operation processing procedure for detecting the image of an original placed on the stacking tray of the automatic original supplying apparatus and obtaining image information.

FIG. 9 is a flow chart showing an image detecting operation processing procedure of detecting the images of the originals placed on the stacking tray of the automatic original supplying apparatus to thereby obtain image information. This processing program is stored in the ROM 1002 in the CPU circuit portion 1000, and is executed by the CPU 1001.

First, whether originals are set is detected by the original detecting tray 2 of the automatic original supplying apparatus 1 (step S1), and if the originals are not set, the apparatus waits until the original is set. When the originals are set by an operator, the CPU circuit portion 1000 is informed of it through the CPU circuit portion 400, and it is waited for for the start key 404a of the operating portion 404 to be depressed by the operator (step S2). When the start key 404a is depressed, the uppermost original of a bundle of originals placed on the stacking tray 2 is photographed by the area sensor 300, and the image information thereof is obtained (step S3).

When the image information is obtained, the original separating operation is started (step S4). The details of this separating operation will be described later. When the separating operation is finished, whether an original to be separated next is present on the stacking tray 2 is discriminated (step S5), and if the next original is present, return is made to the step S3, where a similar operation of obtaining the image information of the original to be separated next is repeated. On the other hand, if the original is not present, this processing is finished.

(Separating Operation)

Figure 10:
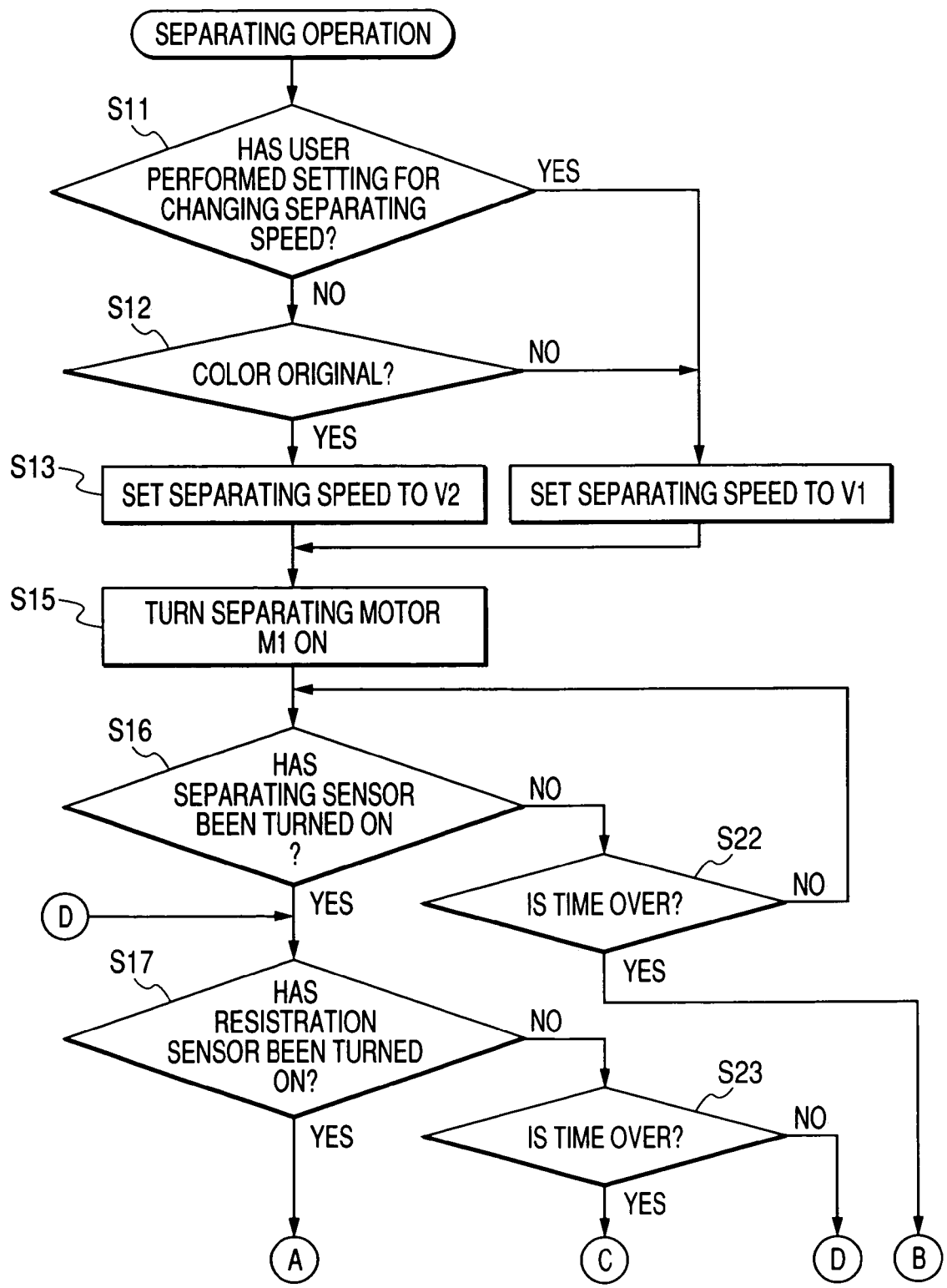
FIG. 10 is a flow chart showing an original separating operation processing procedure.
Figure 11:
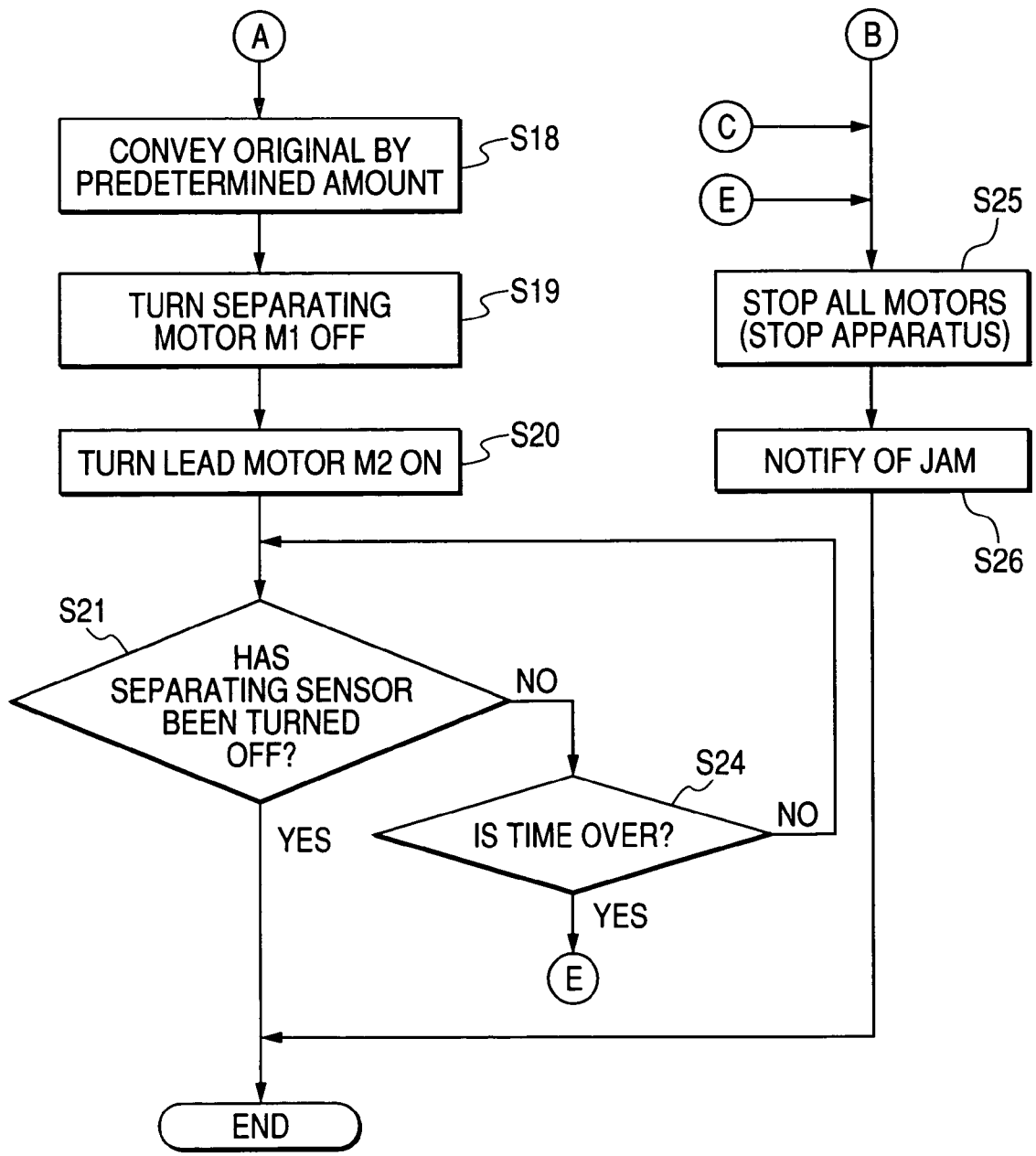
FIG. 11 is a flow chart showing the original separating operation processing procedure.

FIGS. 10 and 11 are flow charts showing the separating operation processing procedure at the step 4. First, before the start key 404a is depressed, whether the setting for changing the speed of the original to be separated has been effected by a setting key 404b provided in the operating portion 404 is discriminated (step S11). FIG. 12 shows a user setting screen displayed on a display panel provided on the operating portion 404 and when setting whether the user sets a separating speed. Here, a color original separating mode is a mode in which when for example, a color-copied sheet is used as an original, and the separating speed is rendered into a low speed to thereby improve a separating accuracy. The actually used original need not always be a color-copies sheet. This user setting screen is "YES" for default. In a case where the user does not change the separating speed, but sets an ordinary separating speed irrespective of a color original or a black-and-white original, the user depresses the setting key 404b to thereby set "NO", whereby the apparatus is operated only at the ordinary separating speed.

When the setting key 404b has been depressed, it is judged that the change of the separating speed by the user is set, and irrespective of the kind of the original, the separating speed is set to the ordinary separating speed V1 (step S14). On the other hand, if at the step S11, nothing is set by the setting key 404b and the start key 404a has been depressed, it is judged that there is not user setting. If a change of this separating speed is not set, whether the original to be separated is a color original is discriminated on the basis of color information which is the image information obtained at the aforedescribed step S3 (step S12). If the original to be separated is a black-and-white original, at a step S14, the separating speed is set to the ordinary separating speed V1. On the other hand, if at the step S12, the original to be separated is a color original to be separated is a color original, the separating speed is set to a separating speed V2 lower than the ordinary separating speed V1 (step S13), to thereby improve separating performance and ensure the original to be separated.

When the separating speed is determined, the separating motor M1 is activated (turned on) to thereby start the separating operation (step S15). Then, whether the separation detecting sensor S1 has been turned on by the leading edge of the original separated and fed is discriminated (step S16), and if the separation detecting sensor S1 is not ON, a preset timer 1006 discriminate whether time is over (step S22). If time is not over, return is made to the step S16, where similar processing is repeated. On the other hand, if time is over, shift is made to the processing of a step S25 which will be described later.

On the other hand, when the separation detecting sensor S1 becomes ON, whether the registration sensor S2 has been turned on by the leading edge of the original is discriminated (step S17). If the registration sensor S2 is not ON, the preset timer 1006 discriminates whether time is over (step S23). If time is not over, return is made to the step S17, where similar processing is repeated. On the other hand, if time is over, shift is made to the processing of a step S25 which will be described later.

On the other hand, when the registration sensor S2 becomes ON, the original is conveyed by a predetermined amount by the separating motor M1 in order to form the leading edge of the original into a loop by the first registration rollers 7a and 7b to thereby effect skew feed correction (step S18), whereafter the separating motor M1 is stopped (Step S19). After the leading edge of the original has been formed into a loop by the first registration rollers 7a and 7b, the lead motor M2 is activated (turned on), and the conveyance of the original to the reading position is started (step S20). Then, whether the separation detecting sensor S1 has been turned off by the trailing edge of the original is discriminated (Step S21). If the separation detecting sensor S1 is not ON, the preset timer 1006 discriminates whether time is over (step S24). If time is not over, return is made to the step S21, where similar processing is repeated. On the other hand, if time is over, the process proceeds to a step S25 which will be described later. On the other hand, when at the step S21, the separation detecting sensor S1 is turned off by the trailing edge of the original, it is judged that the separating operation has been performed normally, and this processing is finished.

On the other hand, if at the step S22, S23 or S24, the timer 1006 discriminates that time is over, it is judged that the automatic original supplying apparatus 1 is in an abnormal state, and all motors are stopped (step S25), and the reader portion 60 is notified of jam information which informs of the abnormal state (step S26), and this processing is finished. In the reader portion 60, the jam information is displayed on a display panel provided on the operating portion 404.

While in the above-described embodiment, whether the original is a color original or a black-and-white original is judged on the basis of the color information of the obtained original feature information, and the separating speed is changed by the result of the judgment, design may be made such that before the start of the separation, the size of the original is judged by an area sensor and the separating speed is changed on the basis of the judged size. For example, design may be made such that if the size of the original is larger than a predetermined size, the separating speed is set to a low speed, and if the size of the original is smaller than the predetermined size, the separating speed is set to a high speed. Also, the separating speed may be changed on the basis of both of the color information and the size information.

(Reading Operation)

Figure 13:
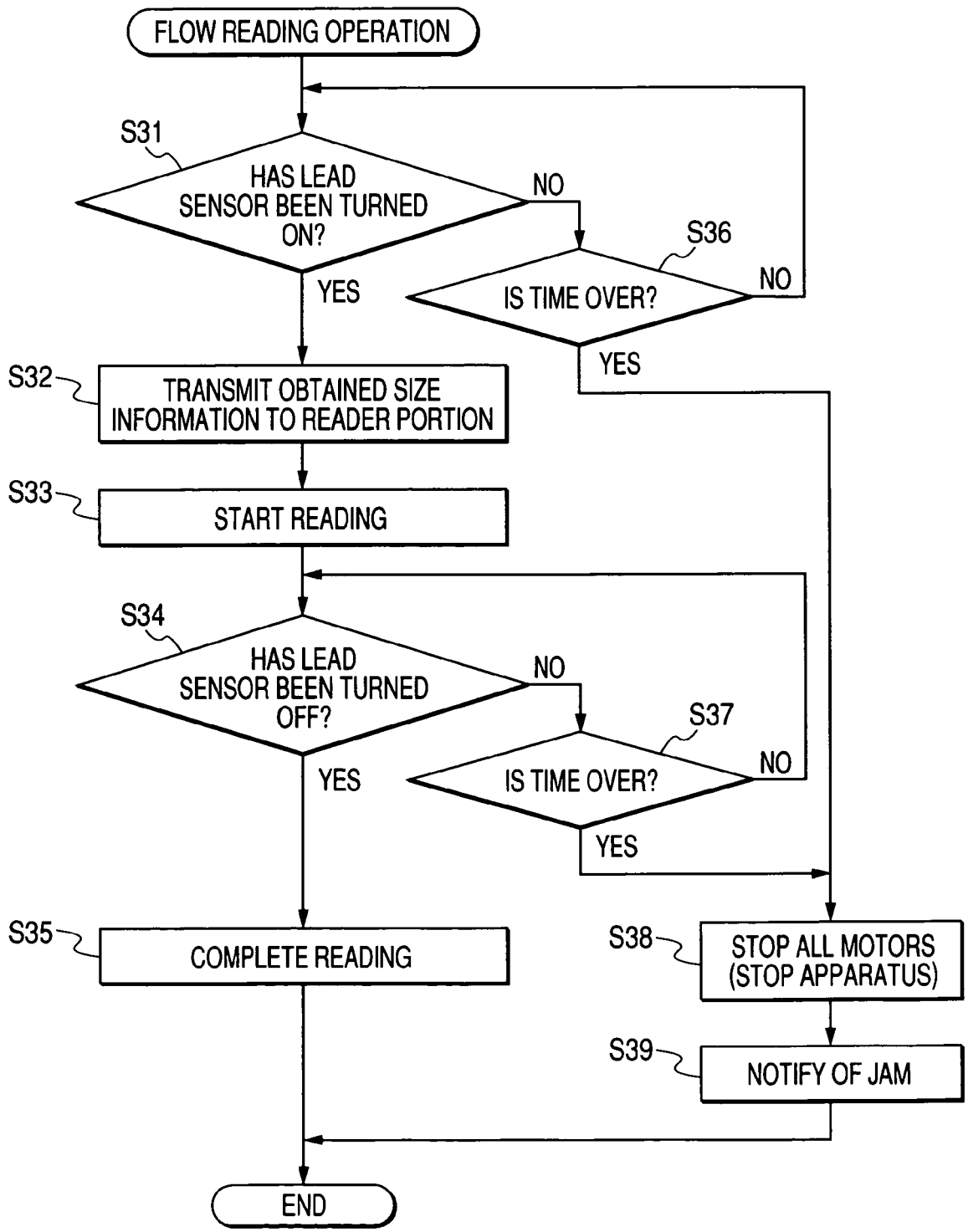
FIG. 13 is a flow chart showing an original flow reading operation processing procedure.

FIG. 13 is a flow chart showing a flow reading operation processing procedure by the automatic original supplying apparatus 1. This processing program is stored in the ROM 1002 in the CPU circuit portion 1000, and is executed by the CPU 1001. In the flow reading mode, the image reading operation is performed with the lead sensor S3 provided upstream of the reading position 53 as the reference.

First, whether the lead sensor S3 has been turned on by the leading edge of the original being conveyed is discriminated (step S31). If the lead sensor S3 is not ON, the preset timer 1006 discriminates whether time is over (step S36). If time is not over, return is made to the step S31, where similar processing is repeated. On the other hand, if time is over, shift is made to the processing of a step S38 which will be described later. When at the step S31, the lead sensor S3 has become ON, the size information of the original of the image information obtained at the aforedescribed step S3 is transmitted to the image reader controlling portion 201 (step S32).

When thereafter, the leading edge of the original arrives at the reading position 53, the scanner unit 63 in the reader portion 60 is fixed at a flow reading position, and the image reading operation is started while the original is conveyed (step S33). During the conveyance of the original in the image reading operation, whether the lead sensor S3 becomes OFF is discriminated (step S34), and when the lead sensor S3 becomes OFF, the image reading operation is finished at a stage whereat the trailing edge of the original has arrived at the reading position 53 (step S35). Thereafter, this processing is finished.

On the other hand, if at the step S34, the lead sensor S3 is not OFF, the preset timer 1006 discriminates whether time is over (step S37). If time is not over, return is made to the step S34, where similar processing is repeated. On the other hand, if time is over, it is judged that the automatic original supplying apparatus 1 is in an abnormal state, and all motors are stopped (step S38), and the reader portion 60 is notified of jam information which informs of the abnormal state (step S39), thus finishing this processing. In the reader portion 60, the jam information is displayed on the display panel provided on the operating portion 404.

As described above, according to the automatic original supplying apparatus according to the first embodiment, before the original is separated, the image information of the originals stacked on the stacking tray is detected and therefore, before the originals placed on the stacking tray are separated and conveyed, information regarding the originals can be obtained. Also, on the basis of the obtained image information of the originals, the speed at which the originals are separated can be automatically changed. Accordingly, when a color original has been detected, it is possible to make the separating speed low to thereby prevent the originals from being paid out in overlapping relationship with one another, improve the separating performance and performs a highly accurate original image reading operation. Also, of the image information, the size information of the original is used, whereby it is possible to obtain image data reliably even if originals of different sizes are mixedly stacked.

Second Embodiment

Figure 14:
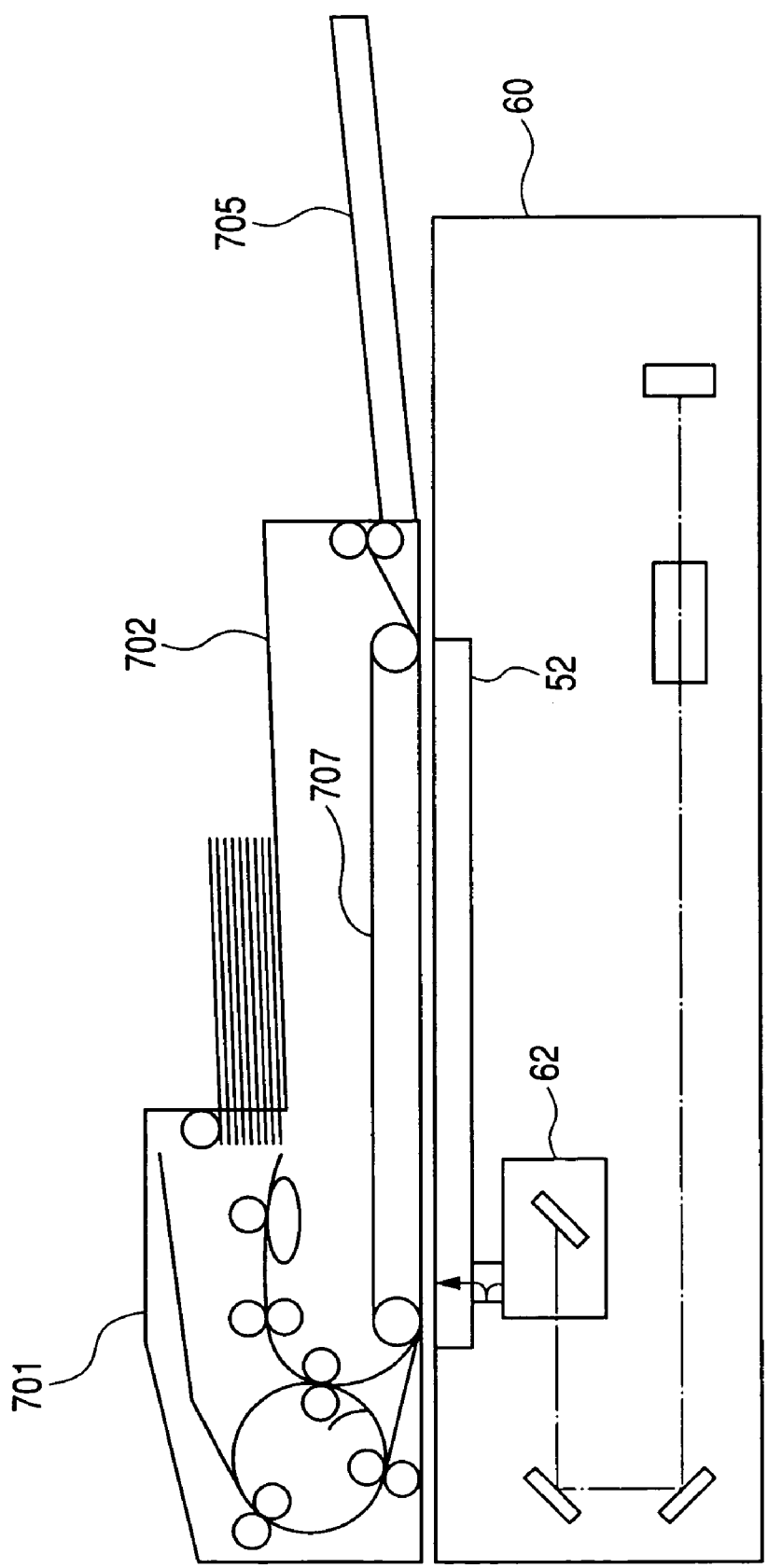
FIG. 14 schematically shows the construction of an automatic original supplying apparatus according to a second embodiment.

FIG. 14 schematically shows the construction of an automatic original supplying apparatus according to a second embodiment. The automatic original supplying apparatus 701 according to the second embodiment is carried on a copying machine similar to that in the aforedescribed first embodiment, and the same constituents as those in the aforedescribed first embodiment are given the same reference characters and need not be described. In FIG. 14, there are only shown the automatic original supplying apparatus 701 differing from the first embodiment and a reader portion (image reader) 60.

The automatic original supplying apparatus 701 serves to feed originals stacked on an original tray 702 one by one in succession from the first page, and convey them onto an original glass stand (original plate) 52 via a curved path. In the first embodiment, there has been only the flow reading mode as the original reading method, but in the second embodiment, there are two methods, i.e., a fixed-reading mode and the flow reading mode. In the fixed-reading mode, when the original is to be read, the conveyance of the original is stopped at a point of time whereat the trailing edge of the original has arrived at a reading position R1 on the original glass stand 52, and in this state, the scanner unit 62 is moved from the left to the right as viewed in FIG. 14, to thereby perform the original reading operation. On the other hand, in the flow reading mode, the original reading operation is performed with the scanner unit 62 fixed at the reading position R1 while the original is conveyed to the reading position R1 at a predetermined reading speed. The thus read original is conveyed by a conveying belt 707 and discharged onto a discharging tray 705. When a color-copied sheet is used as an original, there is the undesirable possibility that due to the influence of oil applied to the original, the conveyance of the original is not stable in the flow reading. Accordingly, in the case of a color original, original image reading is performed in the fixed-reading mode to thereby prevent an image blur during reading.

Also, various sensors including the lead sensor are disposed at locations similar to those in the first embodiment (not shown). A camera main body having an area sensor is also rotatably contained in a recess formed in the upper surface of the housing, as in the first embodiment (not shown).

Figure 15:
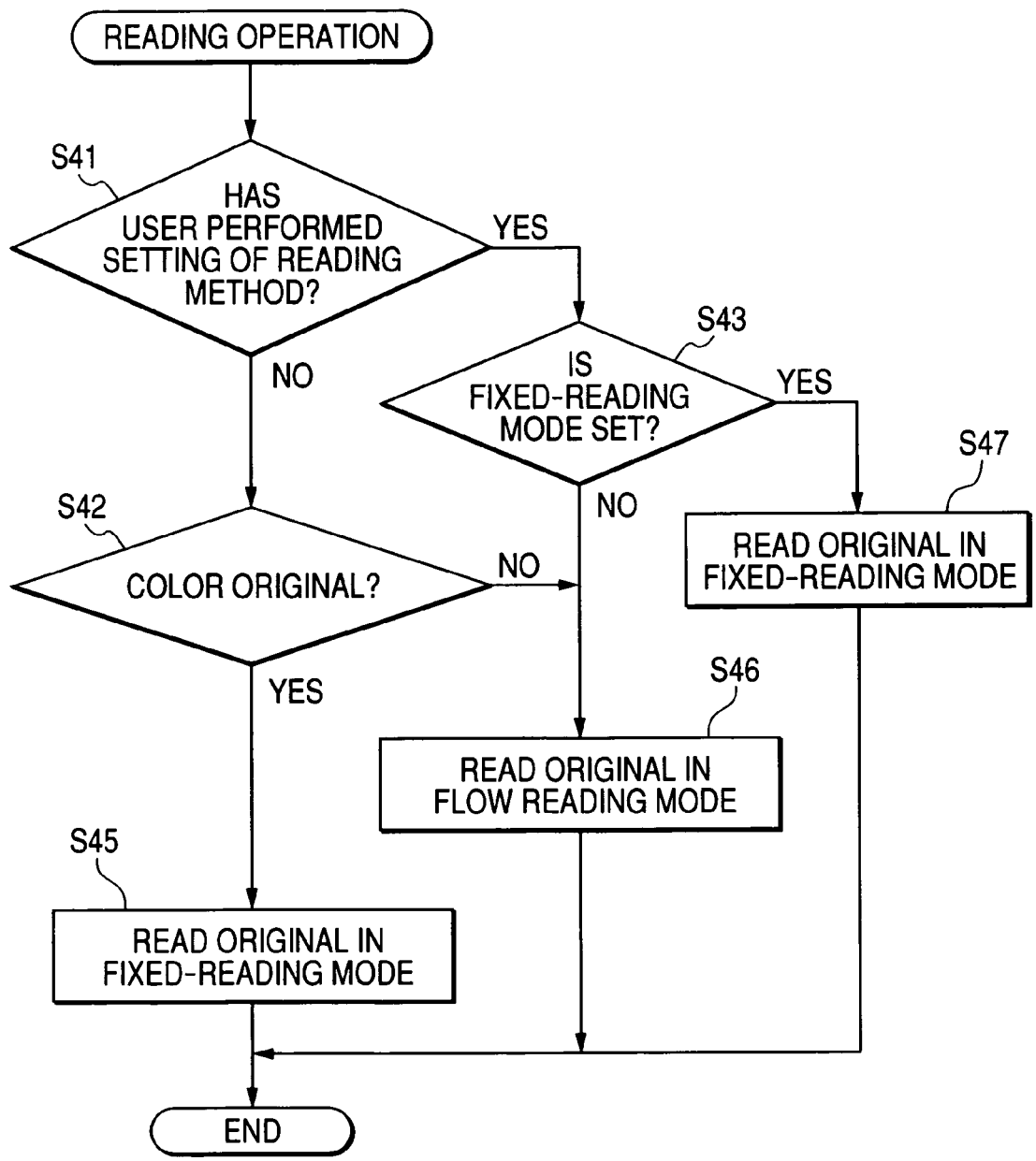
FIG. 15 is a flow chart showing the reading operation procedure of the automatic original supplying apparatus.

FIG. 15 is a flow chart showing the reading operation procedure of the automatic original supplying apparatus. This processing program is stored in the ROM 1002 in the CPU circuit portion 1000, and is executed by the CPU 1001. As previously described, when the original separating operation is finished, the reading operation is performed. First, before the start key 404a is depressed, whether the original reading method has been set from the operating portion 404 by the user, that is, whether one of the flow reading mode and the fixed-reading mode has been set, is discriminated (step S41).

FIG. 16 shows a user setting screen when the reading methods in the fixed-reading mode and the flow reading mode are set. In this user setting screen, an "automatic" reading method for default is set. In the "automatic" reading method, in the case of a color original, the setting for determining to the fixed-reading mode is effected, and in the case of a black-and-white original, the setting for determining to the flow-reading mode is effected. On the other hand, when "only fixed-reading" or "only flow reading" is set, the apparatus operates in each operating mode only. As previously described, this user setting screen can be arbitrarily set by the user before the copy start key 404a is depressed.

In a case where the original reading method is set by the user, whether the mode is the fixed-reading mode is discriminated (step S43). When the mode is set to the fixed-reading mode, the reading operation is performed in the fixed-reading mode (step S47). Thereafter, this processing is finished. On the other hand, if at the step S43, the flow reading mode is set, the reading operation is performed in the flow reading mode (step S46). Thereafter, this processing is finished.

On the other hand, if the original reading method is not set by the user, as previously described, whether the original is discriminated on the basis of color information of the image information detected by the area sensor 300 (step S42). In the case of a color original, the reading operation is performed in the fixed-reading mode (step S45). Thereafter, this processing is finished. On the other hand, if the original separated at the step S42 is a black-and-white original, the reading operation is performed in the flow reading mode (step S46). Thereafter, this processing is finished.

Figure 17:
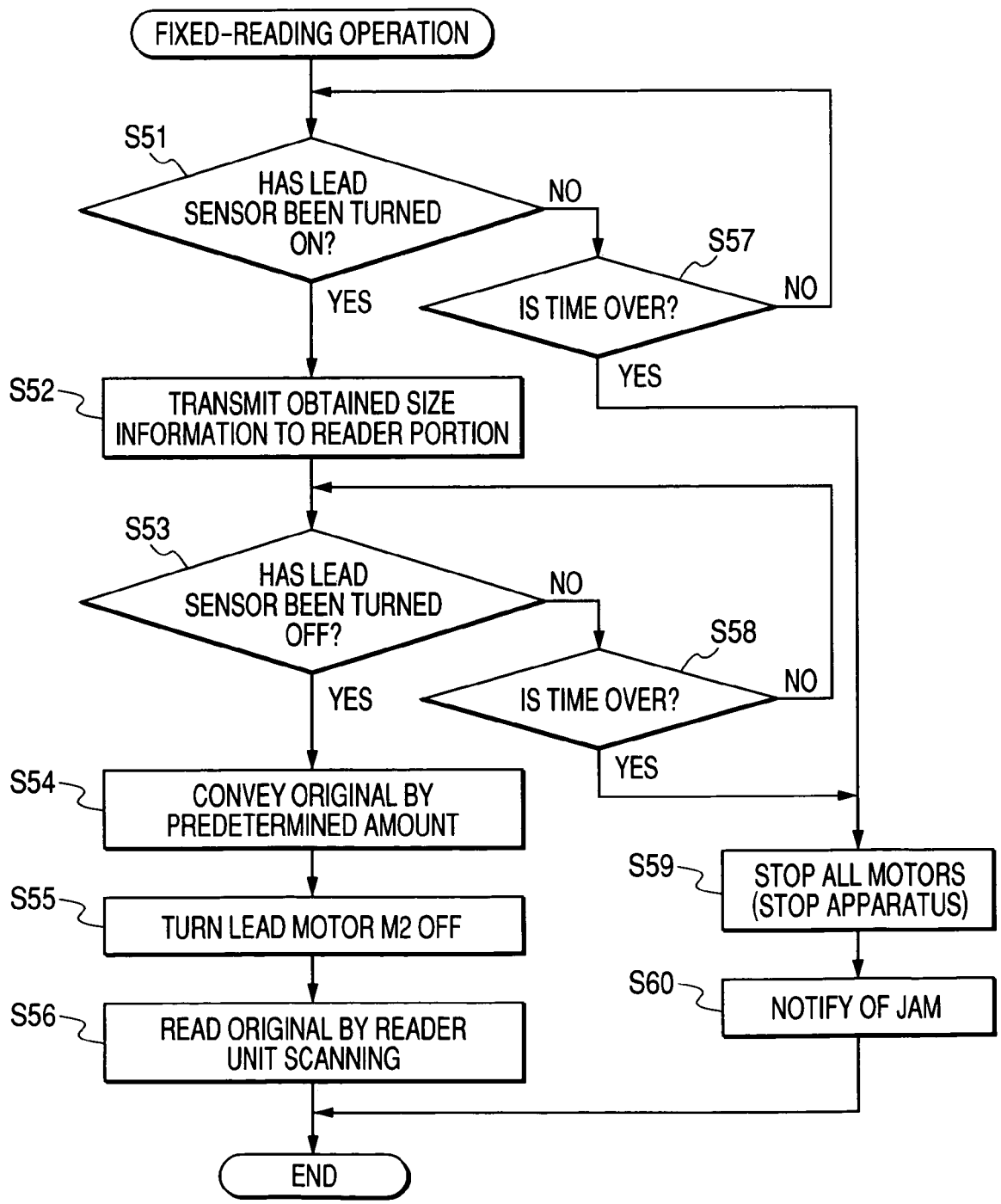
FIG. 17 is a flow chart showing a reading operation processing procedure in a fixed-reading mode.

FIG. 17 is a flow chart showing the reading operation processing procedure in the fixed-reading mode. In the fixed-reading mode, the image reading operation is performed with the output from the lead sensor provided upstream of the reading position as the reference. Whether the lead sensor has been turned on by the leading edge of the original is discriminated (step S51). If the lead sensor is not ON, the preset timer 1006 discriminates whether time is over (step S57). If time is not over, return is made to the step S51, where similar processing is repeated. On the other hand, if the timer 1006 discriminates that time is over, shift is made to the processing of a step S59 which will be described later. On the other hand, if at the step S51, the lead sensor becomes ON, of the image information detected by the area sensor 300, the original size information is transmitted to the image reader controlling portion 201 (step S52).

Thereafter, whether the lead sensor has become OFF is discriminated (step S53). If the lead sensor is not OFF, the preset timer 1006 discriminates whether time is over (step S58). If time is not over, return is made to the step S53, where similar processing is repeated. On the other hand, if time is over, shift is made to the processing of a step S59 which will be described later.

On the other hand, if at the step S53, the lead sensor becomes OFF, the original is conveyed by a predetermined amount (step S54) and the lead motor M2 is stopped (step S55) in order to stop the trailing edge of the original at the reading position R1 on the original glass stand 52. In a state in which the original has been set on the original glass stand 52, the scanner unit 62 of the reader portion 60 is moved from the left to the right in FIG. 14 to thereby perform the original image reading operation (step S56). Thereafter, this processing is finished.

On the other hand, if at the steps S57 and S58, the timer 1006 discriminates that time is over, it is judged that the automatic original supplying apparatus 701 is in an abnormal state, and all motors are stopped (step S59), and the reader portion 60 is notified of jam information which informs of the abnormal state (step S39), thus completing this processing. In the reader portion 60, the jam information is displayed on the display panel provided on the operating portion 404.

Also, the reading operation processing procedure in the flow reading mode is similar to that in the first embodiment shown in FIG. 13. First, whether the lead sensor has been turned on by the leading edge of the original is discriminated (step S31). If the lead sensor is not ON, the preset timer 1006 discriminates whether time is over (step S36). If time is not over, return is made to the step S31, where similar processing is repeated. On the other hand, if time is over, the process proceeds to a step S38 as described later. If at the step S31, the lead sensor becomes ON, of the image information obtained at the aforedescribed step S3, the size information of the original is transmitted to the image reader controlling portion 201 (step S32).

When thereafter, the leading edge of the original arrives at the reading position 53, the scanner unit 62 in the reader portion 60 is fixed, and the image reading operation is started while the original is conveyed (step S33). During the conveyance of the original in the image reading operation, whether the lead sensor becomes OFF is discriminated (step S34), and when the lead sensor becomes OFF, the image reading operation is finished at a stage whereat the trailing edge of the original has arrived at the reading position 53 (step S35). Thereafter, this processing is finished. On the other hand, if at the step S34, the lead sensor is not OFF, the preset timer 1006 discriminates whether time is over (step S37). If time is not over, return is made to the step S34, where similar processing is repeated. On the other hand, if time is over, it is judged that the automatic original supplying apparatus 1 is in an abnormal state, and all motors are stopped (step S38), and the reader portion 60 is notified of jam information which informs of the abnormal state (step S39), thus finishing this processing. In the reader portion 60, the jam information is displayed on the display panel provided on the operating portion 404.

As described above, according to the automatic original supplying apparatus according to the second embodiment, the image reading mode is changed in accordance with the color information of an image and therefore, when a color original is detected, the original is scanned in the fixed-reading mode to thereby obtain image data, and when a black-and-white original is detected, image data is obtained while the original is conveyed in the flow reading mode, whereby an image blur during color original reading in which the surface of the original is liable to slip as compared with a black-and-white original can be prevented.

In the construction of the second embodiment, the blurred image of a color original can also be prevented if instead of the camera main body being provided upright on the upper surface of the housing of the automatic original supplying apparatus, an area sensor 300 is provided at a predetermined location on the path from the original tray 702 to the book platen (original platen) 52, and design is made such that the image reading mode is changed in accordance with the color information of the original detected by the area sensor 300, and when a color original is detected, the original is scanned in the fixed-reading mode to thereby obtain image data, and when a black-and-white original is detected, image data is obtained while the original is conveyed in the flow reading mode.

While the embodiments of the present invention have been described above, the present invention is not restricted to the constructions of these embodiments, but is applicable to any construction which can achieve the functions shown in the appended claims, or the functions the constructions of the embodiments have.

Also, the objects of the present invention can also be achieved by supplying a system or an apparatus with a storage medium having recorded therein the program code of software which achieves the functions of the embodiments, and the computer (or the CPU, MPU or the like) of the system or the apparatus reading out and executing the program code stored in the storage medium. In this case, the program code itself read out from the storage medium realizes the functions of the aforedescribed embodiments and thus, the storage medium storing the program code therein constitutes the present invention.

Also, the storage medium for supplying the program code may be comprised of a memory card such as a ROM, a Floppy (registered trademark) disk, a PCMCIA card or Compact Flash (registered trademark), a hard disk, a micro DAT, a magneto-optical disk, an optical disk such as CD-R or CD-RW, a phase changing type optical disk such as DVD, or the like.

Also, the computer executes the program code read out thereby, whereby not only the functions of the above-described embodiments are realized, but also there is covered a case where on the basis of the instructions of the program code, an operating system (OS) or the like working on the computer executes part or the whole of actual processing, and the functions of the aforedescribed embodiments are realized by the processing.

Further, there is also covered a case where the program code read out from the storage medium is written into a memory provided in a function enlarging board inserted in the computer or a function enlarging unit connected to the computer, whereafter on the basis of the instructions of the program code, a CPU or the like provided in the function enlarging board or the function enlarging unit executes part or the whole of actual processing, and the functions of the aforedescribed embodiments are realized by the processing.

The present invention is not restricted to the above-described embodiments, but various modifications are possible within the scope of the invention shown in the appended claims.

This application claims priority from Japanese Patent Application No. 2004-081176 filed on Mar. 19, 2004, which is hereby incorporated by reference herein.

What is claimed is:
1. A sheet supplying apparatus comprising:
an original stacking portion on which originals to be conveyed are stacked;
a separating portion which separates the originals stacked on said stacking portion one by one;
a conveying portion which conveys an original separated by said separating portion;

a detecting sensor which detects feature information of the originals stacked on said stacking portion before the separation by said separating portion is started; and a controlling portion which controls a separating speed of said separating portion on the basis of the feature information detected by said detecting sensor.

2. A sheet supplying apparatus according to claim 1, wherein said controlling portion makes the separating speed low when it is judged on the basis of the feature information detected by said detecting sensor that the original is a color original.

3. A sheet supplying apparatus according to claim 1, wherein said detecting sensor has an area sensor provided on an upper surface of a housing of said sheet supplying apparatus.

4. A sheet supplying apparatus according to claim 1, wherein said controlling portion makes the separating speed low on the basis of original size information of the feature information detected by said detecting sensor when the original is larger than a predetermined size.

5. A sheet supplying apparatus according to claim 1, further comprising a setting portion which manually sets instructions to cancel the control of the separating speed based on said feature information by said controlling portion.

6. An original reading apparatus comprising:

an original stacking portion on which an original to be conveyed is stacked;

a conveying portion which conveys the original stacked on said stacking portion;

a detecting sensor which detects feature information of the original stacked on said stacking portion before the conveyance by said conveying portion is started;

an original reading portion which has a first reading mode for reading an image of the original during the conveyance of the original by said conveying portion, and a second reading mode for reading the image of the original conveyed to a predetermined position by said conveying portion and stopped in the predetermined position; and a controlling portion which selects the reading modes by said original reading portion on the basis of the feature information detected by said detecting sensor.

7. An original reading apparatus according to claim 6, wherein said controlling portion selects said second reading mode when it is judged on the basis of the feature information detected by said detecting sensor that the original is a color original.

8. A method of controlling a sheet supplying apparatus having an original stacking portion on which originals to be conveyed are stacked, a separating portion which separates the originals stacked on said stacking portion one by one, a sensor which detects a surface of an original stacked on said original stacking portion, and a conveying portion which conveys an original separated by said separating portion, said method comprising:

a detecting step which detects feature information of the originals stacked on said stacking portion on the basis of an output of the sensor before the separation by said separating portion is started; and a controlling step which controls a separating speed of said separating portion on the basis of the feature information detected by said detecting step.

9. A method according to claim 8, wherein at said controlling step, the separating speed is made low when it is judged on the basis of color information of the feature information detected by said detecting step that the originals are color originals.

10. A method of controlling an original reading apparatus having an original stacking portion on which an original to be conveyed is stacked, a sensor which detects a surface of the original stacked on said original stacking portion, a conveying portion which conveys the original stacked on said stacking portion, and an original reading portion which has a first reading mode for reading an image of the original during the conveyance of the original by said conveying portion and a second reading mode for reading the image of the original conveyed to a predetermined position by said conveying portion and stopped in the predetermined position, said method comprising:

a detecting step which detects feature information of the original stacked on said stacking portion on the basis of an output of the sensor before the conveyance by said conveying portion is started; and a controlling step which selects the reading modes by said original reading portion on the basis of the feature information detected by said detecting step.

11. A method according to claim 10, wherein at said controlling step, said second reading mode is selected when it is judged on the basis of the feature information detected by said detecting step that the original is a color original.

12. A sheet supplying apparatus comprising:

a sheet stacking portion on which sheets to be conveyed are stacked;

a separating portion which separates the sheets stacked on said stacking portion one by one;

a conveying portion which conveys a sheet separated by said separating portion;

a detecting sensor which detects color information of the images of the sheets stacked on said stacking portion before the separation by said separating portion is started; and a controlling portion which makes a separating speed of said separating portion low when it is judged on the basis of the color information detected by said detecting sensor that said sheets are sheet on which color images are recorded.

* * * * *

UNITED STATES PATENT AND TRADEMARK OFFICE
CERTIFICATE OF CORRECTION

| | |
|---|---|
| PATENT NO. | : 7,338,042 B2 |
| APPLICATION NO. | : 11/074713 |
| DATED | : March 4, 2008 |
| INVENTOR(S) | : Shimizu |

It is certified that error appears in the above-identified patent and that said Letters Patent is hereby corrected as shown below:

ON THE TITLE PAGE:
At Item (56), References Cited, Foreign Patent Documents, "08274942 A" should read --8-274942 A--.

COLUMN 4:
Line 18, "two-side" should read --two-sided--.
Line 21, "two-side" should read --two-sided--.
Line 49, "one-side" should read --one-sided--.
Line 51, "two-side" should read --two-sided--.
Line 57, "one-side" should read --one-sided--.

COLUMN 5:
Line 49, "two-side" should read --two-sided--.
Line 53, "one-side" should read --one-sided--.

COLUMN 6:
Line 4, "two-side" should read --two-sided--.
Line 31, "faces" should read --that faces--.

COLUMN 9:
Line 1, "color-copies" should read --color-copied--.
Line 34, "discriminate" should read --discriminates--.

COLUMN 10:
Line 25, "both of" should read --both--.

COLUMN 11:
Line 16, "performs" should read --perform--.

UNITED STATES PATENT AND TRADEMARK OFFICE
CERTIFICATE OF CORRECTION

PATENT NO. : 7,338,042 B2
APPLICATION NO. : 11/074713
DATED : March 4, 2008
INVENTOR(S) : Shimizu It is certified that error appears in the above-identified patent and that said Letters Patent is hereby corrected as shown below:

<u>COLUMN 16</u>:
Line 53, "sheet" should read --sheets--.

Signed and Sealed this

Sixteenth Day of December, 2008

JON W. DUDAS
*Director of the United States Patent and Trademark Office*